US012236905B2

(12) United States Patent
Le et al.

(10) Patent No.: US 12,236,905 B2
(45) Date of Patent: *Feb. 25, 2025

(54) DYNAMIC BACKLIGHT COLOR SHIFT COMPENSATION SYSTEMS AND METHODS

(71) Applicant: Apple Inc., Cupertino, CA (US)

(72) Inventors: Chengrui Le, San Jose, CA (US); Fang-Cheng Lin, San Jose, CA (US); Alexey Kornienko, Watford (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,802

(22) Filed: Aug. 21, 2023

(65) Prior Publication Data

US 2024/0105132 A1 Mar. 28, 2024

Related U.S. Application Data

(63) Continuation of application No. 17/934,568, filed on Sep. 22, 2022.

(51) Int. Cl.
*G09G 3/36* (2006.01)
*G09G 3/34* (2006.01)

(52) U.S. Cl.
CPC ........... *G09G 3/3413* (2013.01); *G09G 3/342* (2013.01); *G09G 3/36* (2013.01); *G09G 2320/0646* (2013.01); *G09G 2360/16* (2013.01)

(58) Field of Classification Search
CPC ........ G09G 3/3413; G09G 3/342; G09G 3/36; G09G 2320/0666; G09G 2310/066; G09G 2360/16; G09G 3/3406
See application file for complete search history.

(56) References Cited

U.S. PATENT DOCUMENTS

| | | | |
|---|---|---|---|
| 8,400,391 B2 | 3/2013 | Schmidt et al. | |
| 9,614,130 B2 | 4/2017 | Yamashita et al. | |
| 9,870,739 B2 | 1/2018 | Huang et al. | |
| 10,571,744 B1 | 2/2020 | Chang et al. | |
| 10,964,275 B2 | 3/2021 | Petrovich et al. | |
| 11,222,606 B2 | 1/2022 | Ikeyama | |
| 11,776,492 B1 * | 10/2023 | Le | G09G 3/36 345/102 |
| 2007/0013614 A1 | 1/2007 | Oh et al. | |
| 2007/0035706 A1 | 2/2007 | Margulis | |

(Continued)

*Primary Examiner* — Xuemei Zheng

(74) *Attorney, Agent, or Firm* — Fletcher Yoder P.C.

(57) ABSTRACT

A device may include an electronic display having a backlight that generates light and multiple display pixels that modulate the amount of generated light emitted from the electronic display based on compensated image data. The backlight may include multiple illuminators that generate the light, and a first color component illuminator may have a slower response rate than a second color component illuminator. The device may also include image processing circuitry that generates the compensated image data by compensating input image data for a color shift associated with a change in brightness of the backlight and the slower response rate of the first color component illuminator. The input image data may be compensated by increasing first color component pixel values of the input image data relative to second color component pixel values of the input image data, and the compensated image data may be output to the electronic display.

20 Claims, 10 Drawing Sheets

(56) References Cited

U.S. PATENT DOCUMENTS

| | | | |
|---|---|---|---|
| 2009/0102783 | A1 | 4/2009 | Hwang et al. |
| 2016/0086574 | A1 | 3/2016 | Buckley |
| 2016/0358557 | A1* | 12/2016 | Mori .................... G09G 3/3413 |
| 2019/0287469 | A1 | 9/2019 | Park et al. |
| 2020/0301180 | A1* | 9/2020 | Iwamoto ............... G02F 1/1336 |
| 2021/0116751 | A1 | 4/2021 | Iwamoto et al. |

* cited by examiner

DYNAMIC BACKLIGHT COLOR SHIFT COMPENSATION SYSTEMS AND METHODS

CROSS-REFERENCE TO RELATED APPLICATION

This application is a continuation of U.S. application Ser. No. 17/934,568, entitled "DYNAMIC BACKLIGHT COLOR SHIFT COMPENSATION SYSTEMS AND METHODS," filed on Sep. 22, 2022, which is herein incorporated by reference in its entirety.

BACKGROUND

The present disclosure relates generally to image processing and, more particularly, to compensating for a color shift associated with changes in backlight brightness.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

In other words, an image to be displayed may be represented by image data defining luminance values for pixels of the display, and the pixels may emit light that, in the aggregate, form the image. For example, an illuminator (e.g., backlight) may generate light for several different pixels, and each pixel may allow a portion of the generated light to be emitted based on a luminance value of the image data corresponding to the pixel. However, when an illuminator changes brightness, the color of the backlight may change causing undesired visual artifacts such as discolorations to appear.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Many electronic displays include display pixels that modulate the amount of light emitted by a backlight. The backlight may emit light behind the display pixels, and the display pixels may be controlled based on image data to selectively allow a particular amount of light to be transmitted there through. Different display pixels, which may sometimes be referred to as sub-pixels, may include color filters to modulate specific colors of light. For example, some display pixels may be red, green, or blue. Each display pixel may control the luminance output of a single color component. For example, RGB image data may include image data for a red display pixel, a green display pixel, and a blue display pixel. When the display pixels are all programmed with image data, they may modulate different amounts of light to produce an image on the electronic display. Additionally, in some embodiments, the brightness of the backlight may also be modulated to adjust the overall brightness of the display or a portion thereof. However, in some scenarios, changing the brightness of the backlight may lead to a momentary color shift in the generated light.

As such, the change in color of the backlight may cause the luminance levels for one or more color components to be different from the corresponding image data, leading to visible image artifacts (e.g., discolorations). For example, the backlight may include multiple light emitting diodes (LEDs) (e.g., a red LED, a green LED, and a blue LED) to generate the backlight, and a red LED may have a slower response rate than the blue and/or green LEDs, such as in KSF phosphor LEDs.

Image processing circuitry such as a color shift compensation block may compensate for the different response rates of the backlight color components by utilizing one or multiple different techniques. In some embodiments, the color shift compensation block may increase the red pixel values of the image data to compensate for the reduced amount of red light generated as the red backlight LED ramps up in response to an increase in a backlight brightness. As such, while the red LED output is still lower than the output of the other backlight LEDs, the proportion of the red light emitted from the pixels to the generated red light may be greater than the proportion of green/blue emitted light to the green/blue generated light. In other words, the image data corresponding to the red pixels may be adjusted to be proportionally brighter to make up for the proportionally darker red backlight, resulting in the same total red, green, and blue light emission from the pixels that would have occurred if the backlight had not exhibited any color shift. Indeed, in some scenarios, as the red LED brightness increases, the emitted light from the pixels could progress from cyan at the beginning of the image frame (e.g., due to the reduced red LED brightness) to a neutral (e.g., white) or otherwise balanced coloring between the LEDs and/or progress to red. As should be appreciated, the rate of the color change may depend on implementation (e.g., LED response rate characteristics, refresh rate of the display, and/or amount of red pixel value compensation performed). However, even if the image frame included a cyan discoloration at the beginning of the image frame and red discoloration at the end of the image frame, the human eye may average the discolorations over the image frame (or multiple image frames depending on refresh rate) such that the discolorations cancel each other in the aggregate. Indeed, the total amount of red, green, and blue light emitted by the display pixels over the course of the image frame or frames may equal and/or ratio of the amount of red, green, and blue light that would have been emitted if there had not been any color shift by the backlight. Additionally or alternatively, in some embodiments, the green/blue pixel values may be decreased to balance the ratio of the red, green, and blue light emitted by the display pixels. As such, by momentarily (e.g., for one or more image frames depending on refresh rate) increasing the red pixel values and/or decreasing the green/blue pixel values, image artifacts associated with the color shift of a changing backlight brightness may be reduced or eliminated.

Additionally, in some embodiments, the backlight may be increased in stages such that the disparity between the outputs of the backlight LEDs is reduced. For example, the backlight may be increased over multiple image frames and/or at multiple stages (e.g., sub-frames) within a single image frame. Moreover, the backlight brightness increase may be delayed by a portion of a frame (e.g., sub-frame) to such that the LC pixel luminance is reduced prior to backlight activation/the brightness change. By waiting until the LC pixel luminance is reduced, the disparity between the outputs of the backlight LEDs may be less noticeable, as the overall light transmitted through the pixels may be reduced.

Moreover, in the case of decreasing backlight brightness, the above techniques may be used in reverse. For example, the red pixel values may be decreased and/or the blue/green pixel values may be increased in response to a decrease in the backlight brightness.

Additionally, in some embodiments, different color component illuminators may have different efficiencies when operated at various brightness levels. For example, a green illuminator may draw less power when operating at the same brightness level as a red illuminator. As such, a user interface for an electronic device may be designed with lower maximum luminance values for color components of the less efficient illuminators, which may further increase power savings.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
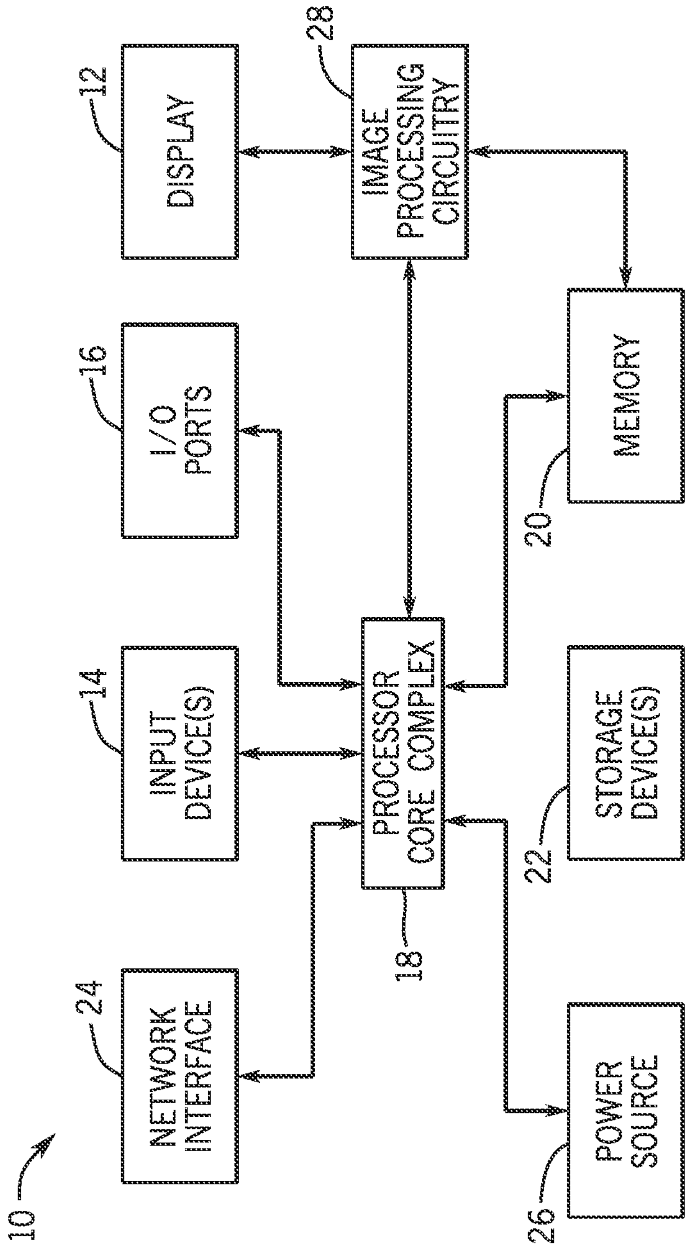
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In some embodiments, the electronic display may include one or more backlights or other illuminators that provides light to multiple pixels. For example, the electronic display may include a single backlight, multiple backlights controlled together, or multiple backlights controlled individually (e.g., according to location on the electronic display or according to color component). Using the light generated by the backlight, pixels may control the luminance output that is emitted from the electronic display per color component to regulate the amount and color of light according to image data.

Additionally, in some embodiments, the brightness of the backlight may also be modulated to adjust the overall brightness of the display or a portion thereof. However, in some scenarios, changing the brightness of the backlight may lead to a momentary color shift in the generated light. As such, the change in color of the backlight may cause the luminance levels for one or more color components to be different from the corresponding image data, leading to visible image artifacts (e.g., discolorations). For example, an LED backlight may be composed of multiple color component LEDs (e.g., a red LED, a green LED, and a blue LED), and the different color component LEDs may operate (e.g., change brightness) at different rates. Such LEDs may include but are not limited to KSF phosphor LEDs, where a red LED may have a slower response rate than the blue and/or green LEDs.

In some scenarios, the color shift of the backlight may be exaggerated by a frame delay of the backlight as a whole. For example, input image data calling for an increase in the output luminance may result in an increase in the backlight brightness, but delayed by one or more frames. As such, the pixel values (e.g., liquid crystal (LC) pixel transmittance) may be momentarily increased (e.g., during the frame before the backlight is increased) to simulate the increase in brightness or, in other words, compensate for the lack of increased backlight brightness. In some embodiments, the increase in pixel values, and therefore pixel transmittance, may allow for the total amount of light emitted from the display pixels to be the same as or closer to that which would have been emitted had there been no frame delay of the backlight. However, when the backlight brightness is increased and the pixel values are returned to the desired level according to the input image data (e.g., decreased), the color shift in the backlight may be more apparent due to the increased pixel values' state at the beginning of the backlight brightness increase and the difference in response rates of one or more color components of the backlight.

In the example of KSF phosphor LEDs, the response rate of the red LED may be slower than the blue and/or green LEDs and, as such, a bluish/greenish (e.g., cyan) flash or discoloration may momentarily appear while the red LED ramps up to the increased brightness level. Although a frame delayed backlight brightness change with the momentary pixel value increase is discussed herein as accentuating the discoloration effect of the change in backlight brightness, as should be appreciated, the features discussed herein may also be applied to systems that do not have a delayed backlight brightness change and are applicable in any suitable scenario where the backlight brightness change causes a color shift. Furthermore, the opposite color shift may also occur when reducing the backlight brightness. For example, the red LED may reduce brightness at a slower rate than the blue and green LEDs leading to a red discoloration. Moreover, for ease of discussion herein, the red LED will be assumed to have a slower response rate than the green and blue LEDs, and the compensations will be discussed in reference thereto. However, as should be appreciated, the discussed techniques may be applicable to compensate for any suitable backlight color shift in response to a change in the backlight brightness.

Image processing circuitry such as a color shift compensation block may compensate for the different response rates of the backlight color components by utilizing one or multiple different techniques. In some embodiments, the color shift compensation block may increase the red pixel values of the image data to compensate for the reduced amount of red light generated as the red backlight LED ramps up in response to an increase in a backlight brightness. As such, while the red LED output is still lower than the output of the other backlight LEDs, the proportion of the red light emitted from the pixels to the generated red light may be greater than the proportion of green/blue emitted light to the generated green/blue light. In other words, the image data corresponding to the red pixels may be adjusted to be proportionally brighter to make up for the proportionally darker red backlight, resulting in a total red, green, and blue light emission and/or a relative proportion of red, green, and blue light emissions that is the same as or closer to the light emission that would have been output from the display pixels had the backlight not exhibited any color shift over the image frame. Furthermore, in some scenarios, as the red LED brightness increases, the emitted light from the pixels may progress from cyan at the beginning of the image frame (e.g., due to the reduced red LED brightness) to a neutral (e.g., white) or otherwise balanced coloring between the LEDs and/or progress to red. As should be appreciated the rate of the color change may depend on implementation (e.g., LED response rate characteristics, refresh rate of the display, and/or amount of red pixel value compensation performed). However, even if the image frame included a cyan discoloration at the beginning of the image frame and red discoloration at the end of the image frame, the human eye may average the discolorations over the image frame (or multiple image frames depending on refresh rate) such that the discolorations cancel each other in the aggregate and appear balanced to a viewer. As such, by momentarily (e.g., for one or more image frames depending on refresh rate) increasing the red pixel values, image artifacts associated with the color shift of a changing backlight brightness may be reduced or eliminated.

Additionally or alternatively, in some embodiments, the backlight may be increased in stages such that the disparity between the outputs of the backlight LEDs is reduced. For example, the backlight may be increased over multiple image frames and/or at multiple stages (e.g., sub-frames) within a single image frame. In other words, the green and blue LEDs may be held at a partial brightness increase while the red LED ramps up, and the green and blue LEDs may be increased again as the increasing red LED catches up. Moreover, the backlight brightness increase may be delayed by a portion of a frame (e.g., sub-frame) to such that the LC pixel luminance is reduced prior to backlight activation/the brightness change. By waiting until the LC pixel luminance is reduced, the disparity between the outputs of the backlight LEDs may be less noticeable, as the overall light transmitted through the pixels may be reduced. Moreover, in the case of decreasing backlight brightness, the above techniques may be used in reverse. For example, the red pixel values may be decreased and/or the blue/green pixel values may be increased in response to a decrease in the backlight brightness.

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
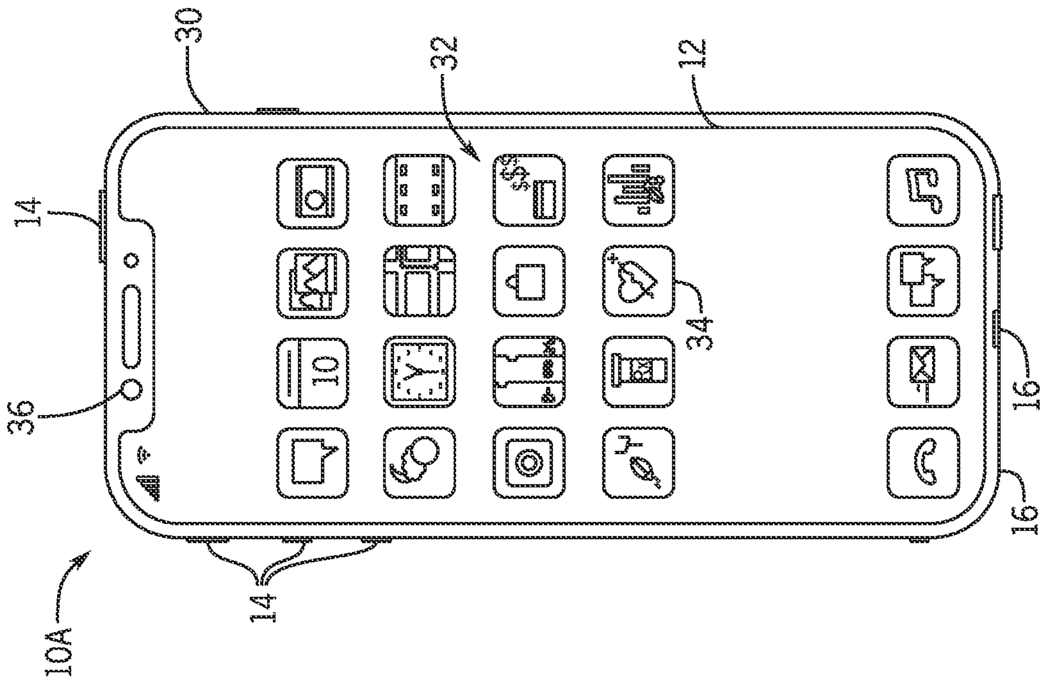
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
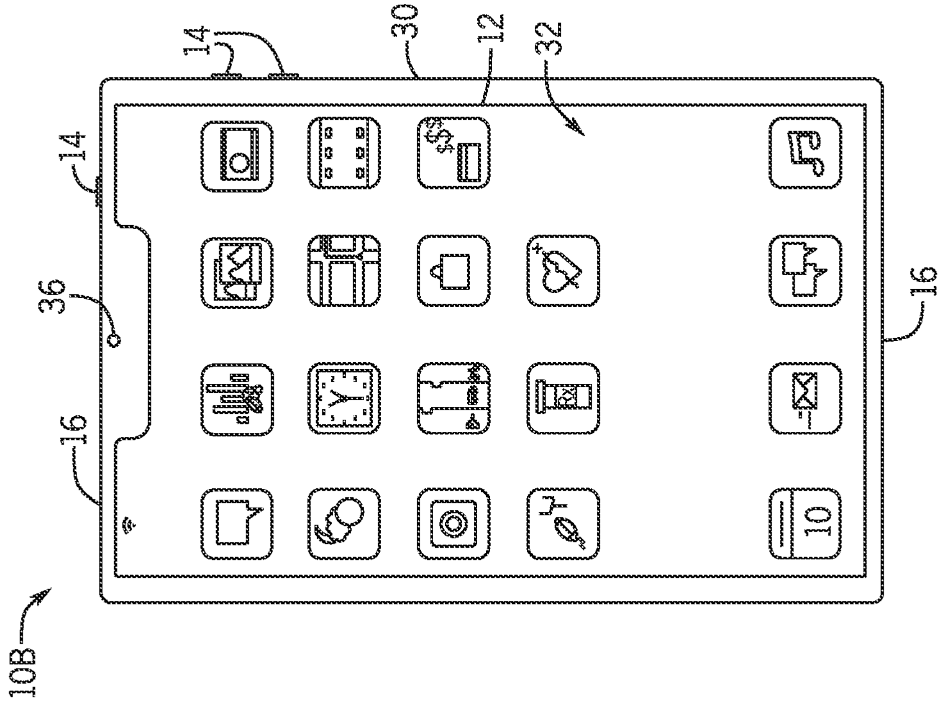
FIG. 3 is another example of the electronic device of FIG. 1 in the form of a tablet device, in accordance with an embodiment.
Figure 4:
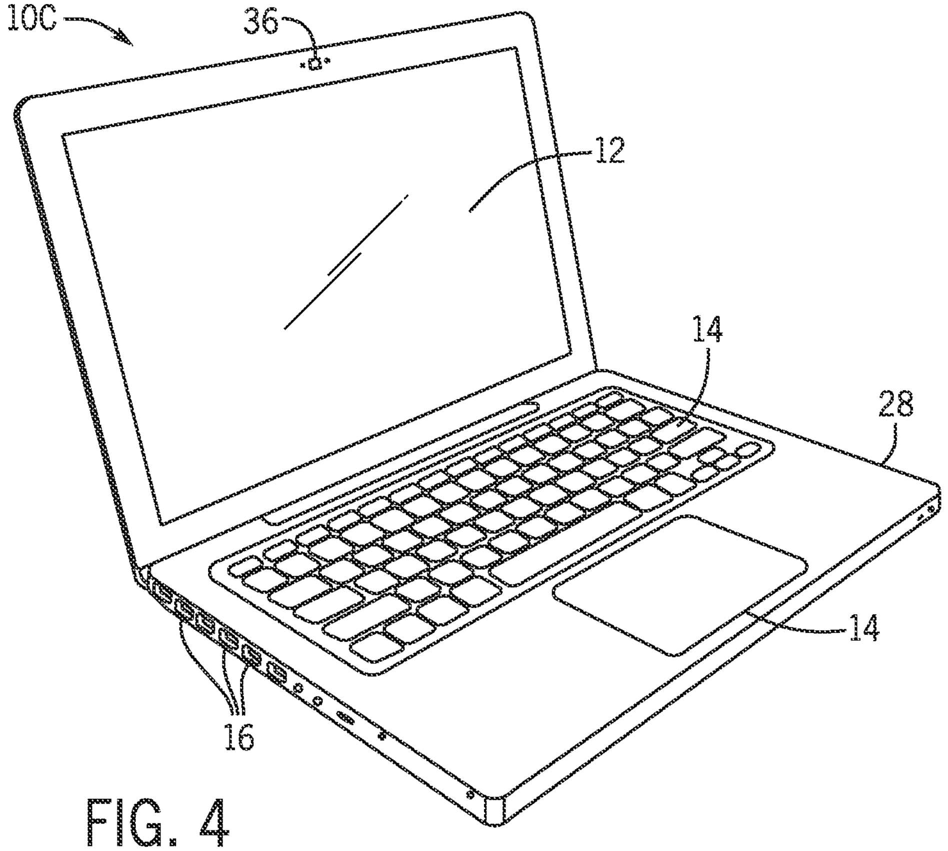
FIG. 4 is another example of the electronic device of FIG. 1 in the form of a computer, in accordance with an embodiment.
Figure 5:
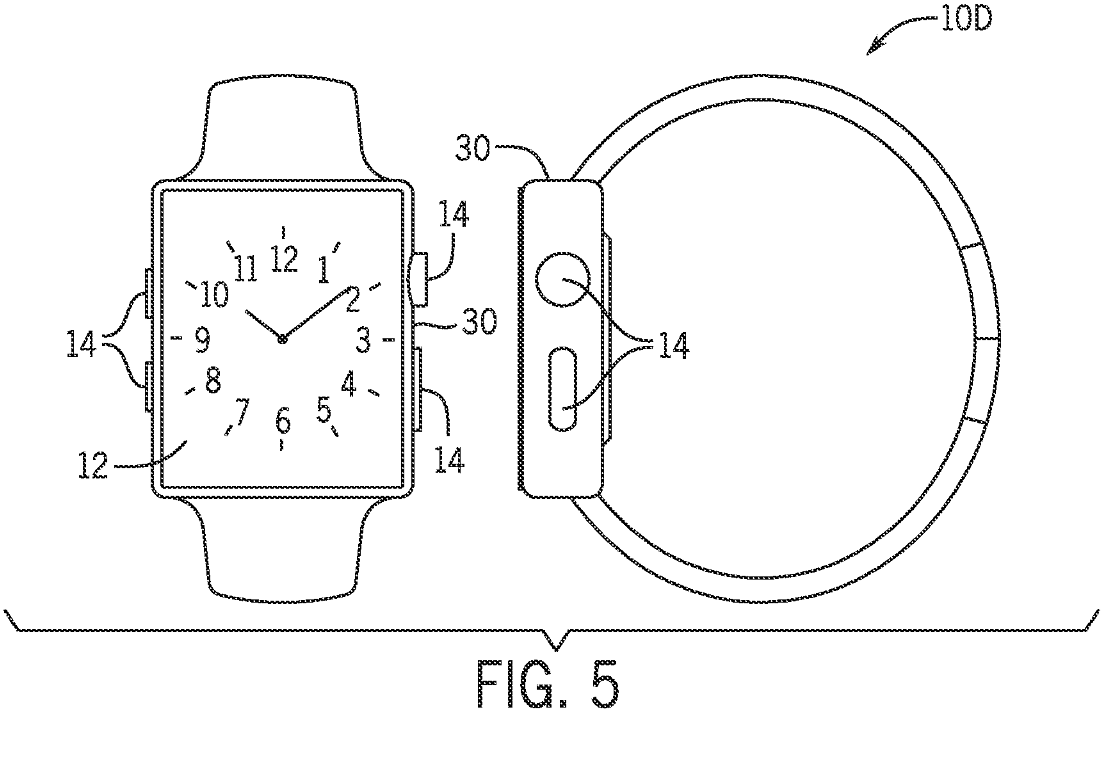
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
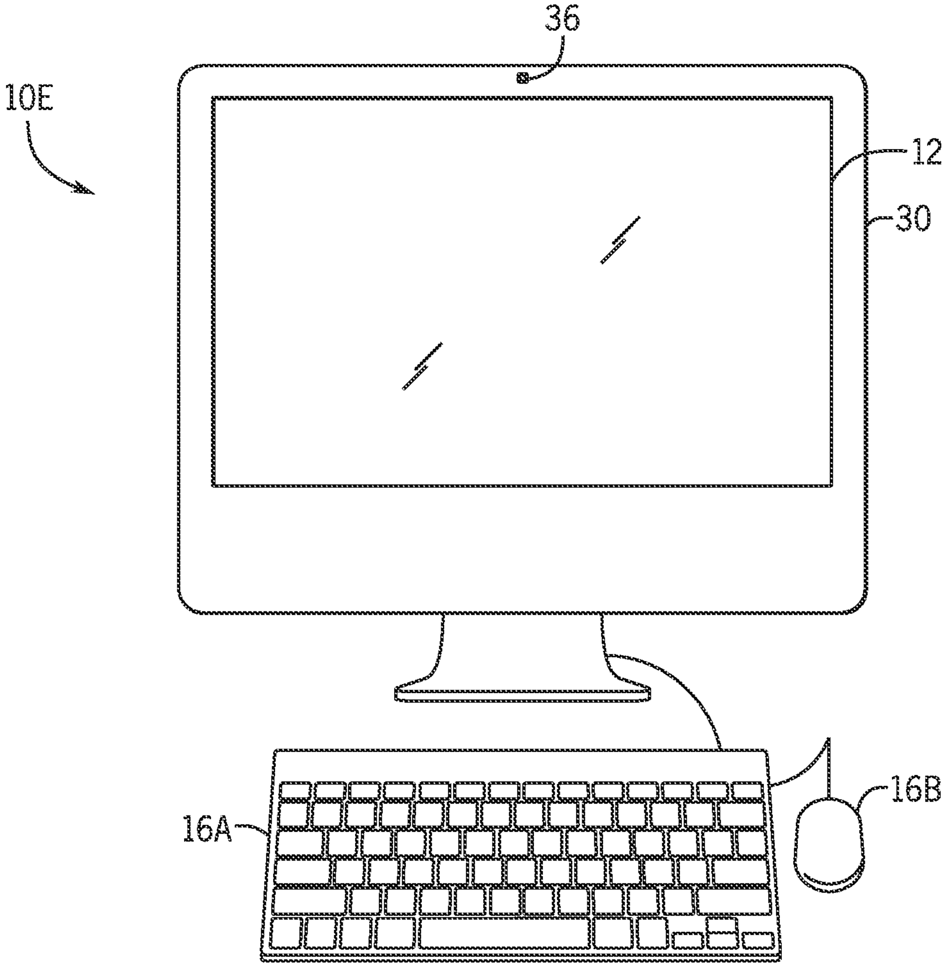
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
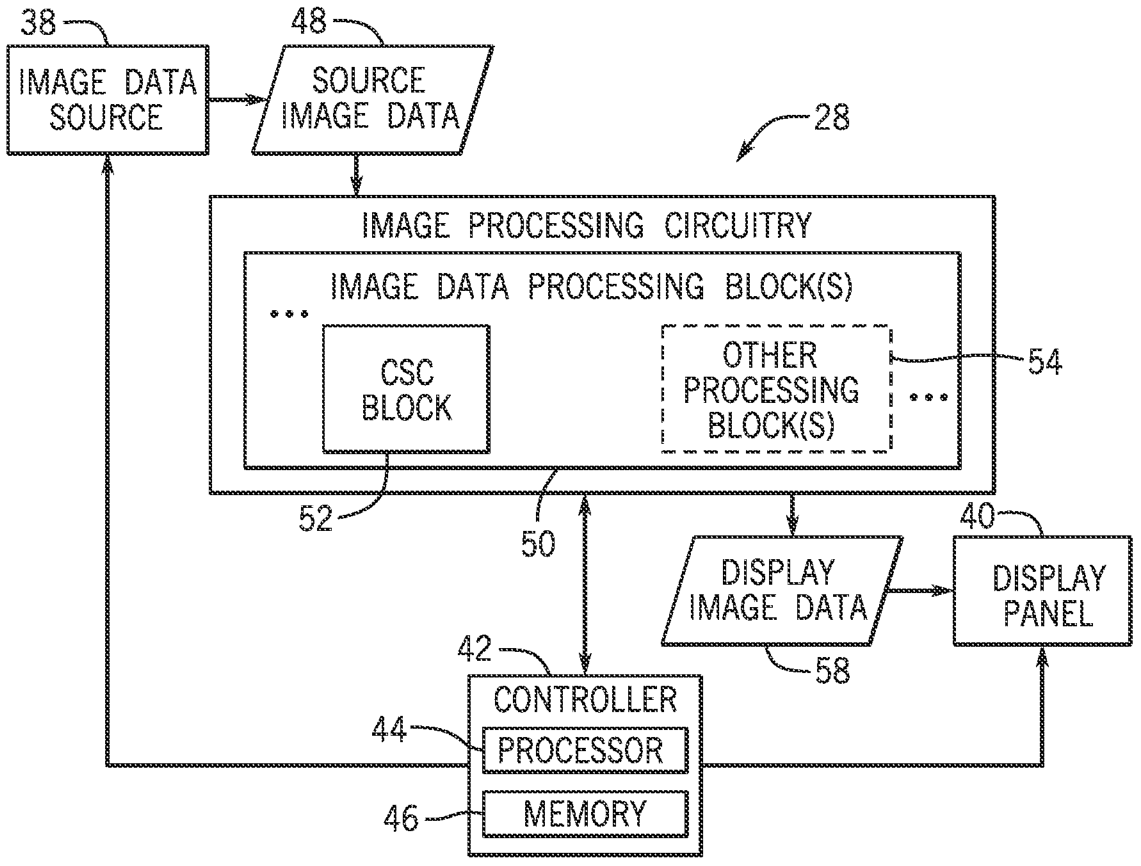
FIG. 7 is a block diagram of the image processing circuitry of FIG. 1 including a color shift compensation (CSC) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a color shift compensation (CSC) block 52. As should be appreciated, multiple other processing blocks 54 may also be incorporated into the image processing circuitry 28, such as a color management block, a dither block, a pixel contrast control (PCC) block, a burn-in compensation (BIC) block, a scaling/rotation block, etc. before and/or after the CSC block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

In some embodiments, the CSC block 52 may compensate image data and/or backlight controls for color shifts associated with brightness changes to a backlight of the electronic display 12. As discussed above, the electronic display 12 may include one or more backlights or other illuminators that provides light to multiple pixels. For example, the electronic display 12 may include a single backlight, multiple backlights controlled together, or multiple backlights controlled individually (e.g., according to location on the electronic display and/or according to color component). Moreover, in some embodiments, the backlight may include multiple light sources (e.g., light emitting diodes (LEDs)) that are utilized in conjunction with each other. For example, a red LED, a green LED, and a blue LED may be operated simultaneously to provide a white backlight. Moreover, for backlights utilizing multiple color component illuminators (e.g., LEDs), the illuminators may be controlled simultaneously and/or individually. While discussed at times as a single backlight for brevity, as should be appreciated, the features discussed herein may be applicable to any electronic display 12 with a single backlight, multiple backlights, a single color backlight, or multi-color backlights (e.g., a red backlight, a green backlight, and a blue backlight).

In general, the backlight may generate light, and pixels may modulate the amount of light (e.g., luminance) that is emitted from the electronic display 12 according to image data (e.g., gray level). Further, in some embodiments, the electronic display may include sub-pixels that modulate the amount of different colors of light (e.g., red, green, blue, and/or white), and each sub-pixel may control the luminance output of a single color component at the pixel location. Additionally, the brightness of the backlight may also be modulated to adjust the overall brightness of the display or a portion thereof.

However, in some scenarios, changing the brightness of the backlight may lead to a momentary color shift in the generated light. In other words, when raising or lowering the brightness of a backlight, the color hue of the light output may change. As such, the change in color of the backlight may cause the luminance levels for one or more color components to be different from the corresponding image data, leading to visible image artifacts (e.g., discolorations). For example, an LED backlight may be composed of multiple color component LEDs (e.g., a red LED, a green LED, and a blue LED), and the different color component LEDs may operate (e.g., change brightness) at different rates. Such LEDs may include but are not limited to KSF phosphor LEDs, where a red LED may have a slower response rate than the blue and/or green LEDs. Moreover, for ease of discussion herein, the red LED will be assumed to have a slower response rate than the green and blue LEDs, and the compensations are discussed in reference thereto. However, as should be appreciated, the discussed techniques may be applicable to compensate for any suitable backlight color shift in response to a change in the backlight brightness.

While the color shift of the backlight may cause visual artifacts on its own, in some scenarios, the color shift may be exaggerated by operations of the electronic display 12 and/or image processing circuitry 28. For example, a frame delay 60 may be implemented when increasing the brightness of the backlight, as in the graph 62 of FIG. 8. The graph 62 includes the amplitude 64 of input image data 66, a backlight profile 68 (e.g., a red backlight profile 68A, a blue backlight profile 68B, and a green backlight profile 68C), and a pixel transmittance 70 (e.g., liquid crystal (LC) pixel transmittance) over multiple image frames 72 in time 74. As used herein, the pixel transmittance 70 is the proportion of light emitted by the display pixels to the light generated by the backlight and received by the display pixels. Indeed, the light emitted from a display pixel is a function of the pixel transmittance 70 and the backlight brightness (e.g., backlight profile 68). In the illustrated example, the backlight profile 68 is increased in the Fth image frame 72 in response to the input image data 66 calling for an increase in the output luminance in the F−1 image frame 72, culminating in a frame delay 60 of the backlight. The frame delay 60 may be due to image data processing timing, implementation of the electronic display 12, and/or any other effect/consequence related to displaying an image on the electronic display 12. Moreover, in some embodiments, the pixel values (e.g., pixel transmittance 70) may be momentarily increased (e.g., during the frame delay 60) beyond that which corresponds to the input image data 66 to simulate the increased brightness of the backlight or, in other words, to compensate for the lack of increased backlight brightness in the F−1 image frame 72. Further, when the backlight brightness (illustrated as the backlight profile 68) is increased (e.g., during the Fth image frame 72), the pixel values (e.g., corresponding to the pixel transmittance 70) may be returned (e.g., decreased) to the desired level according to the input image data 66.

Figure 8:
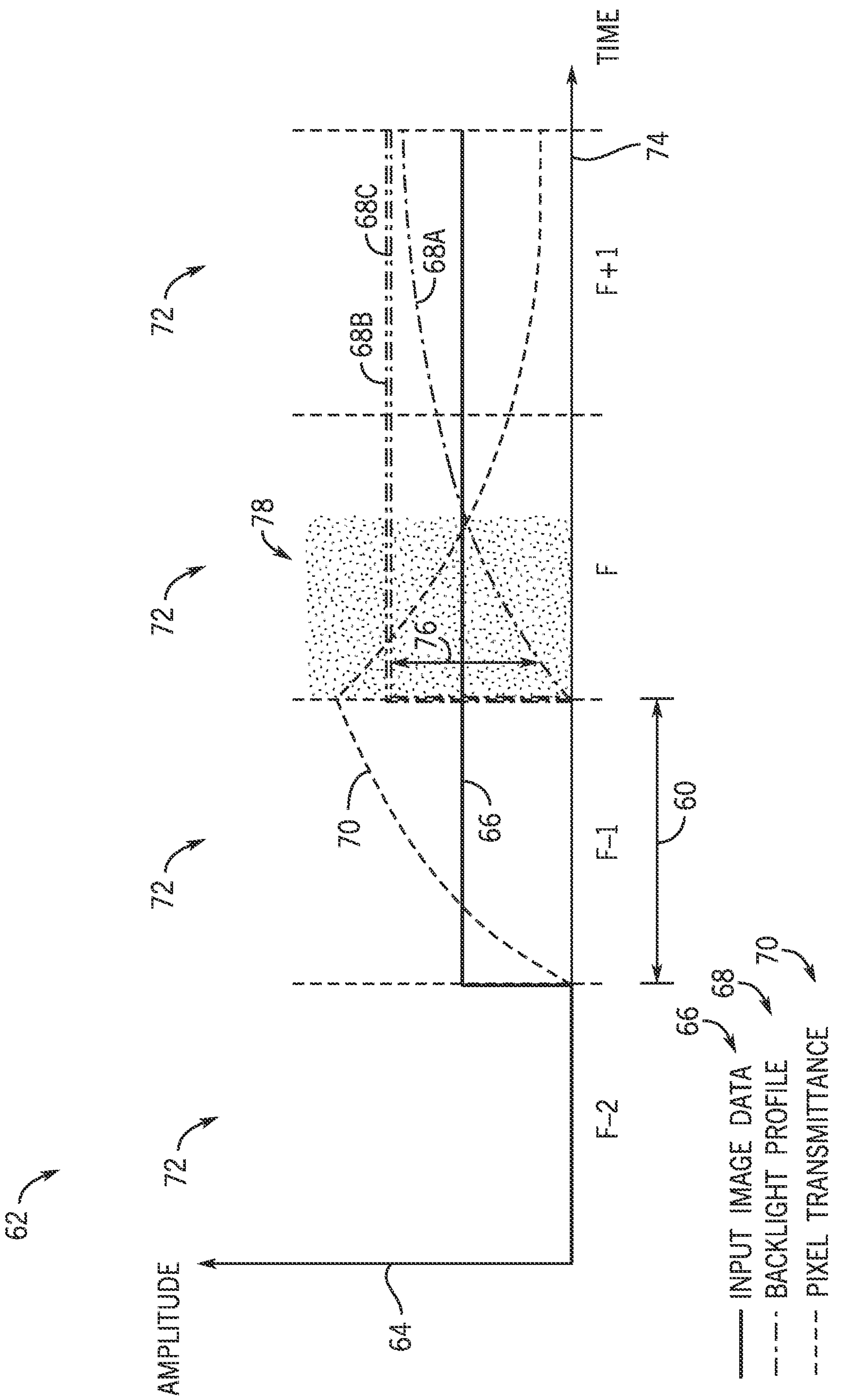
FIG. 8 is a graph of input image data, an RGB backlight profile, and a liquid crystal (LC) pixel transmittance over multiple image frames resulting in a color shift, in accordance with an embodiment.

However, a color shift of the backlight (e.g., due to a lagging red backlight profile 68A) may be more apparent due to the increased pixel transmittance 70 at the beginning of the backlight brightness increase (e.g., at the beginning of the Fth image frame 72). Indeed, as shown in the example of FIG. 8, the pixel transmittance 70 may take time 74 to adjust according to the pixel values of the input image data 66, and the disparity 76 between the red backlight profile 68A and the blue backlight profile 68B and/or green backlight profile 68C may be more visible at increased pixel transmittances 70, such as at the beginning of the Fth image frame 72. As should be appreciated, the visual artifacts of the color shift may be further accentuated (e.g., more noticeable) when transitioning from dark content (e.g., having a gray level of 0/255, less than 5/255, less than 25/255, or the like) to a low gray content (e.g., having a gray level between 1/255 and 1/25, between 1/255 and 50/255, or the like).

In the example of KSF phosphor LEDs, the response rate of the red LED (e.g., the red backlight profile 68A) may be slower than the blue and/or green LEDs (e.g., the blue backlight profile 68B and/or green backlight profile 68C) and, as such, a bluish/greenish (e.g., cyan) flash of discoloration 78 may momentarily appear while the red backlight profile 68A ramps up to the increased brightness level. Although a frame delay 60 of the backlight brightness change with the momentary pixel transmittance 70 increase is discussed herein as accentuating the visual discoloration 78, as should be appreciated, the features discussed herein may also be applied to systems that do not have a frame delay 60 associated with backlight brightness changes and are applicable in any suitable scenario where the backlight brightness change causes a color shift. Furthermore, as should be noted, the opposite color shift may also occur when reducing the backlight brightness. For example, the red backlight profile 68A may reduce brightness at a slower rate than the blue backlight profile 68B and/or green backlight profile 68C leading to a red discoloration 78. Such discoloration 78 may be further accentuated when transitioning from low gray content to dark content. However, as should be appreciated, compensation may or may not be limited to scenarios of accentuated discolorations 78.

Figure 9:
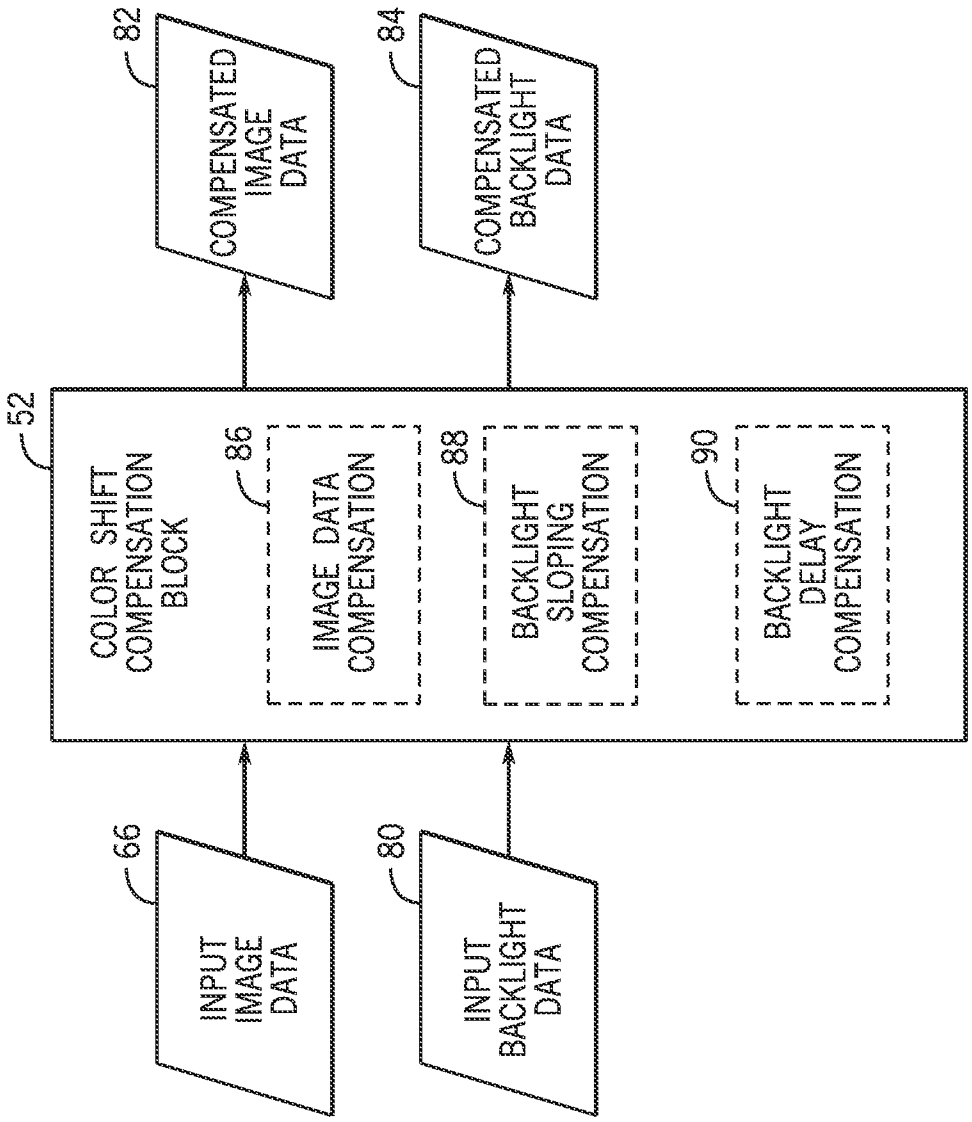
FIG. 9 is a block diagram of the CSC block of FIG. 7, in accordance with an embodiment.

To compensate for the different response rates of the backlight profiles 68 and reduce or eliminate the discoloration 78, the CSC block 52 may utilize one or multiple different techniques. For example, as shown in FIG. 9, the CSC block 52 may receive input image data 66 and/or input backlight data 80 and generate compensated image data 82 and/or compensated backlight data 84 according to an image data compensation 86, a backlight sloping compensation 88, and/or a backlight delay compensation 90.

In some embodiments, the image data compensation 86 of the CSC block 52 may increase the red pixel values relative to those of the input image data 66 to compensate for the reduced amount of red light generated as the red backlight profile 68A ramps up in response to an increase in the backlight brightness. As such, while the red backlight profile 68A may still be lower than the blue backlight profile 68B and/or green backlight profile 68C, the proportion of the red light emitted from the pixels to the red light generated by the backlight (e.g., red LED(s)) may be greater than the proportion of green/blue emitted light to the green/blue light generated by the backlight (e.g., green/blue LED(s)). Thus, the overall light output of the pixels may be more balanced amongst the color components.

In some scenarios, the increased red pixel values of the compensated image data 82 may still yield discolorations 78 during the image frame 72 (e.g., the Fth image frame 72). For example, as the red backlight profile 68A increases over time 74, the emitted light from the pixels may progress from a cyan discoloration 78 at the beginning of the image frame 72 (e.g., due to the reduced red backlight profile 68A) to a neutral (e.g., white) or otherwise balanced coloring, and/or progress to red (e.g., due to the increased red pixel values of the compensated image data 82 and the increasing red backlight profile 68A). As should be appreciated the rate of the color change may depend on implementation (e.g., LED response rate characteristics, refresh rate of the display, and/or amount of red pixel value compensation performed). However, even if the image frame 72 included a cyan discoloration 78 at the beginning of the image frame 72 and red discoloration 78 at the end of the image frame 72, the CSC block 52 may set the image data compensation 86 such that, over the course of the image frame 72 (or multiple image frames depending on refresh rate and the backlight profile 68), the total amount and/or ratio of the different color component lights emitted from the display pixels is the same as or closer to the light emission associated with the input image data 66 had there been no color shift. As such, the discolorations 78 may cancel each other in the aggregate and appear balanced to a viewer. In other words, the human eye may temporally average the discolorations 78 such that the image frame 72 appears color balanced according to the input image data 66. As such, by momentarily (e.g., for one or more image frames 72 depending on refresh rate and/or backlight profile 68) increasing the red pixel values, image artifacts (e.g., discolorations 78) associated with the color shift of a changing backlight brightness may be reduced or eliminated.

Further, in some embodiments, the green and/or blue pixel values may be reduced to balance the proportions of the different color component lights emitted from the display pixels. Furthermore, the backlight may be momentarily increased (e.g., for the Fth image frame 72) above the desired level with decreased green/blue pixel values to maintain a total light output consistent with the input image data 66. As should be appreciated, while discussed herein as increasing the red pixel values and/or decreasing the green/blue pixel values of the compensated image data 82, the image data compensation 86 may be applicable to any color component or multiple color components depending on the hue of the color shift of the backlight.

Figure 10:
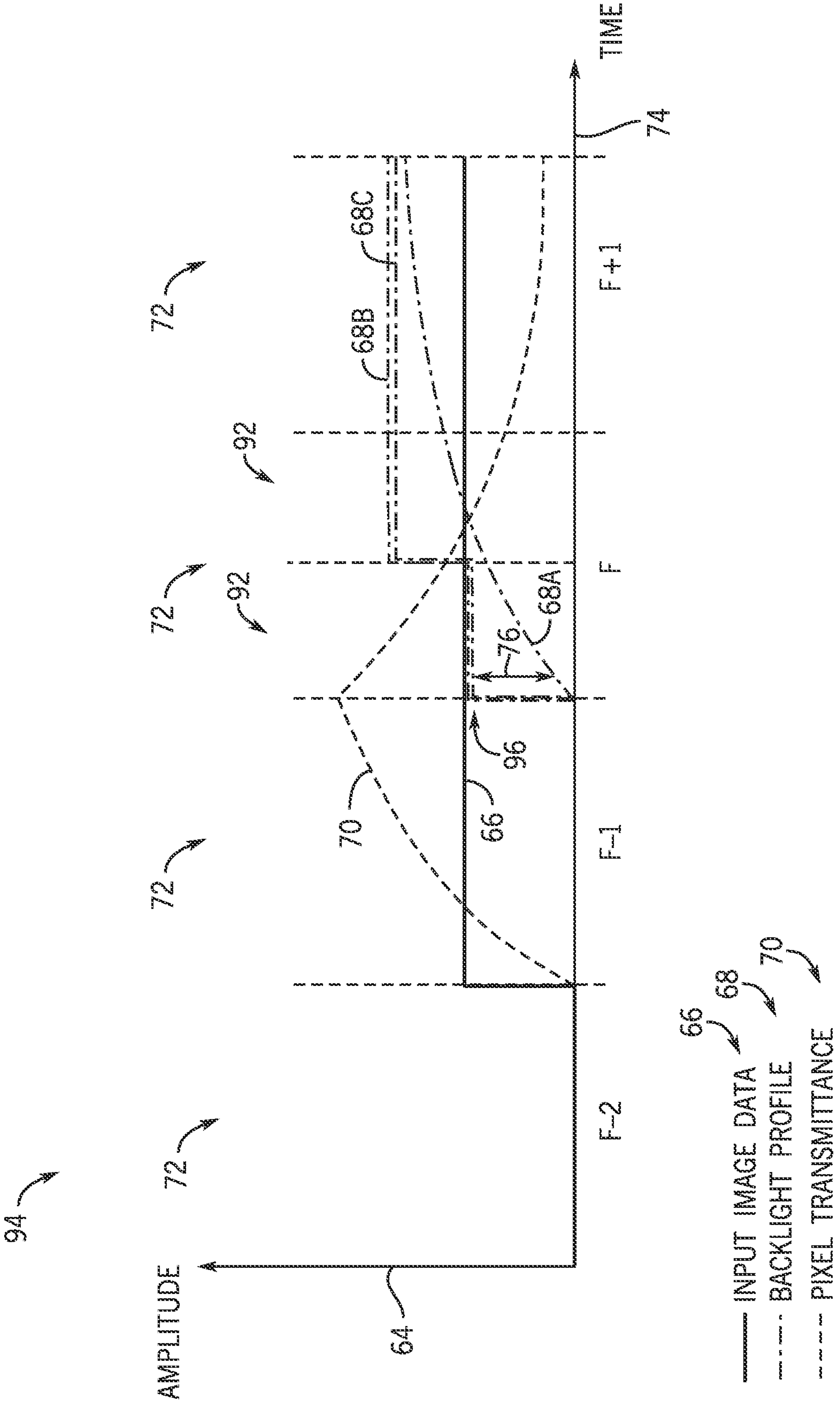
FIG. 10 is a graph of input image data, an RGB backlight profile, and an LC pixel transmittance over multiple image frames with sloped backlight compensation, in accordance with an embodiment.

Additionally or alternatively to the image data compensation 86, in some embodiments, the CSC block 52 may alter parameters of the backlight (e.g., via compensated backlight data 84) to compensate for the color shift associated with the change in backlight brightness. For example, the CSC block 52 may implement backlight sloping compensation 88 to increase the backlight brightness over multiple image frames 72 and/or at multiple sub-frames 92 within a single image frame 72, as in a graph 94 of FIG. 10. In other words, the blue backlight profile 68B and green backlight profile 68C may be raised to an intermediate brightness level 96 while the red backlight profile 68A ramps up, and the blue backlight profile 68B and green backlight profile 68C may be increased again as the increasing red backlight profile 68A catches up. Furthermore, although shown as a two-stage brightness increase, as should be appreciated, the backlight sloping compensation 88 may be implemented over any suitable number of image frames 72, sub-frames 92, and intermediate brightness levels 96. For example, if the image frame 72 is refreshed at 120 Hertz (Hz), the compensated backlight data 84 may operate at 240 Hz, 480 Hz, or higher to achieve multiple stages (e.g., at sub-frames 92) within a single image frame 72. Moreover, the increases in brightness between stages may be equally distributed (e.g., increase linearly) among the image frames 72/sub-frames 92 or increase non-linearly (e.g., based on the red backlight profile 68A). As such, the disparity 76 between the backlight profiles 68 may be reduced, thereby reducing or eliminating visible discoloration 78. Furthermore, in some embodiments, such as where the backlight includes individually adjustable color components, the red component may be increased beginning at the start of the Fth image frame 72, and the blue and green components may be increased at one or more subsequent sub-frames 92 to minimize the disparity 76.

Figure 11:
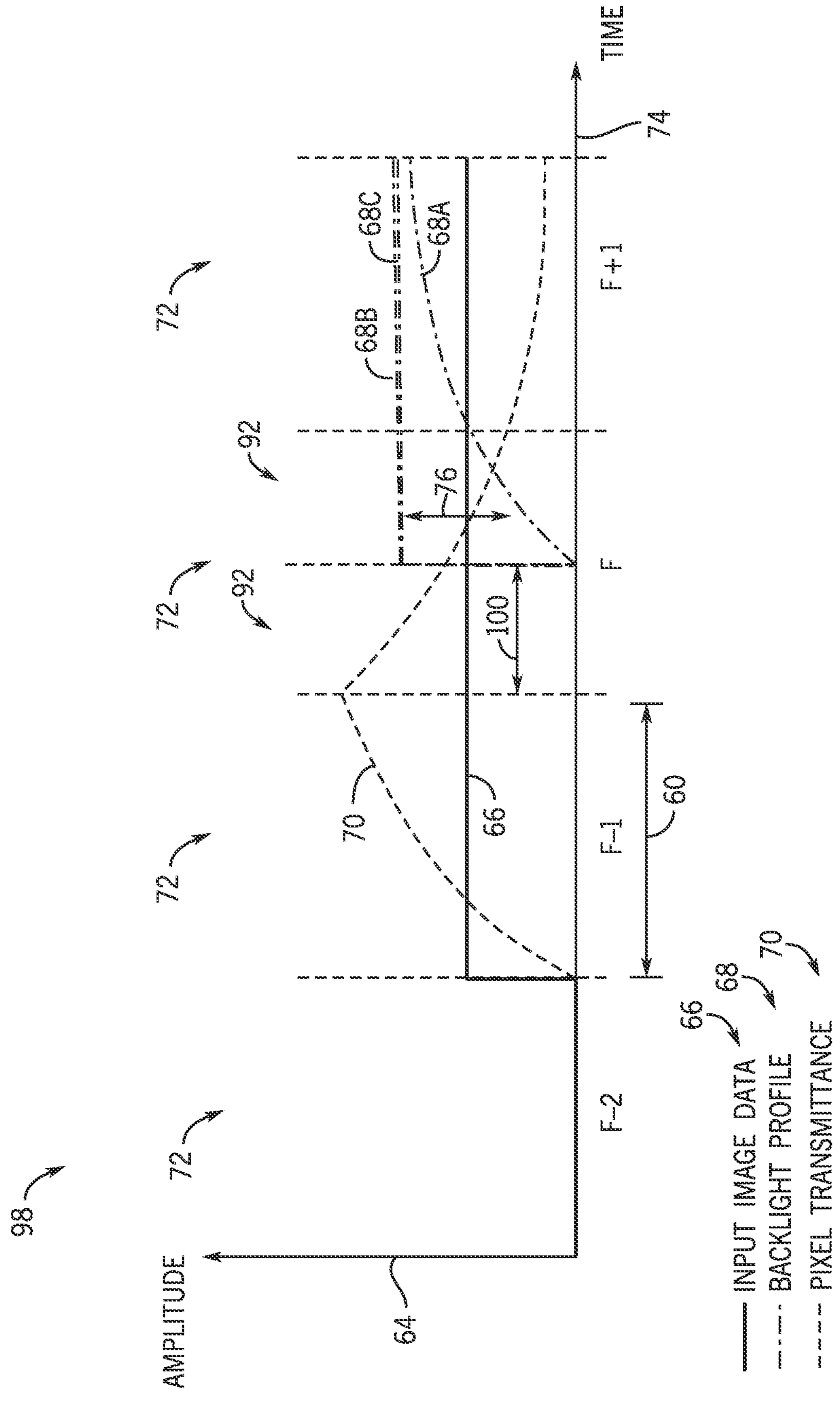
FIG. 11 is a graph of input image data, an RGB backlight profile, and an LC pixel transmittance over multiple image frames with delayed backlight compensation, in accordance with an embodiment.

Additionally or alternatively, the overall backlight brightness increase may be delayed by a portion of an image frame 72 (e.g., sub-frame 92 or amount of time 74) such that the pixel transmittance 70 is reduced prior to backlight activation/the brightness change, as shown in a graph 98 of FIG. 11. As described above in reference to FIG. 8, in some scenarios a frame delay 60 may be implemented with a momentary increase in the pixel transmittance 70 as compensation. By implementing a compensation delay 100, the pixel transmittance 70 may be reduced prior to the backlight activation/the brightness change. By delaying the backlight activation/the brightness change, the disparity 76 between the backlight profiles 68 may be less noticeable, as the overall light transmitted through the pixels (e.g., due to the pixel transmittance 70) may be reduced. Moreover, the compensation delay 100 may include delaying the backlight activation/the brightness change by an image frame 72, one or more sub-frames 92, and/or by an amount of time 74. For example, the compensation delay 100 may wait for one or more sub-frames 92 before changing the brightness of the backlight. Moreover, in some embodiments, the compensation delay 100 may be implemented as a set or adjustable amount of time 74 (e.g., 0.1-10.0 milliseconds (ms), 0.5-5.0 ms, 1.0-3.0 ms, 1.0-2.0 ms, greater than 0.1 ms, greater than 1.0 ms, etc.) regardless of frame scheduling (e.g., image frames 72 and/or sub-frames 92). As should be appreciated, the compensation delay 100, either as a number of image frames 72 or sub-frames 92 or as an amount of time 74, may be based on implementation factors such as but not limited to refresh rate, backlight profiles 68 (e.g., response rates of the backlight LEDs), the number of sub-frames 92 implemented per image frame 72, and/or frame scheduling.

As should be appreciated, while the compensation delay 100 may have a greater effect on decreasing the likelihood of visual artifacts (e.g., discoloration 78) in scenarios that include a frame delay 60 and increased pixel transmittance 70 (e.g., as in the F−1 image frame 72), as should be appreciated, the compensation delay 100 of the backlight delay compensation 90 may be utilized in any suitable scenario (e.g., either for increasing or decreasing backlight brightness) where the pixel transmittance 70 is decreasing to reduce the likelihood of visual artifacts by waiting until the pixel transmittance 70 has been reduced. Moreover, in a similar manner as backlight sloping compensation 88, in some embodiments, such as where the backlight includes individually adjustable color components, the red component may be increased beginning at the start of the Fth image frame 72, and a compensation delay 100 may be applied to the blue and green components such that the disparity 76 between the backlight profiles 68 is maintained at a reduced level until the pixel transmittance 70 has been reduced.

Figure 12:
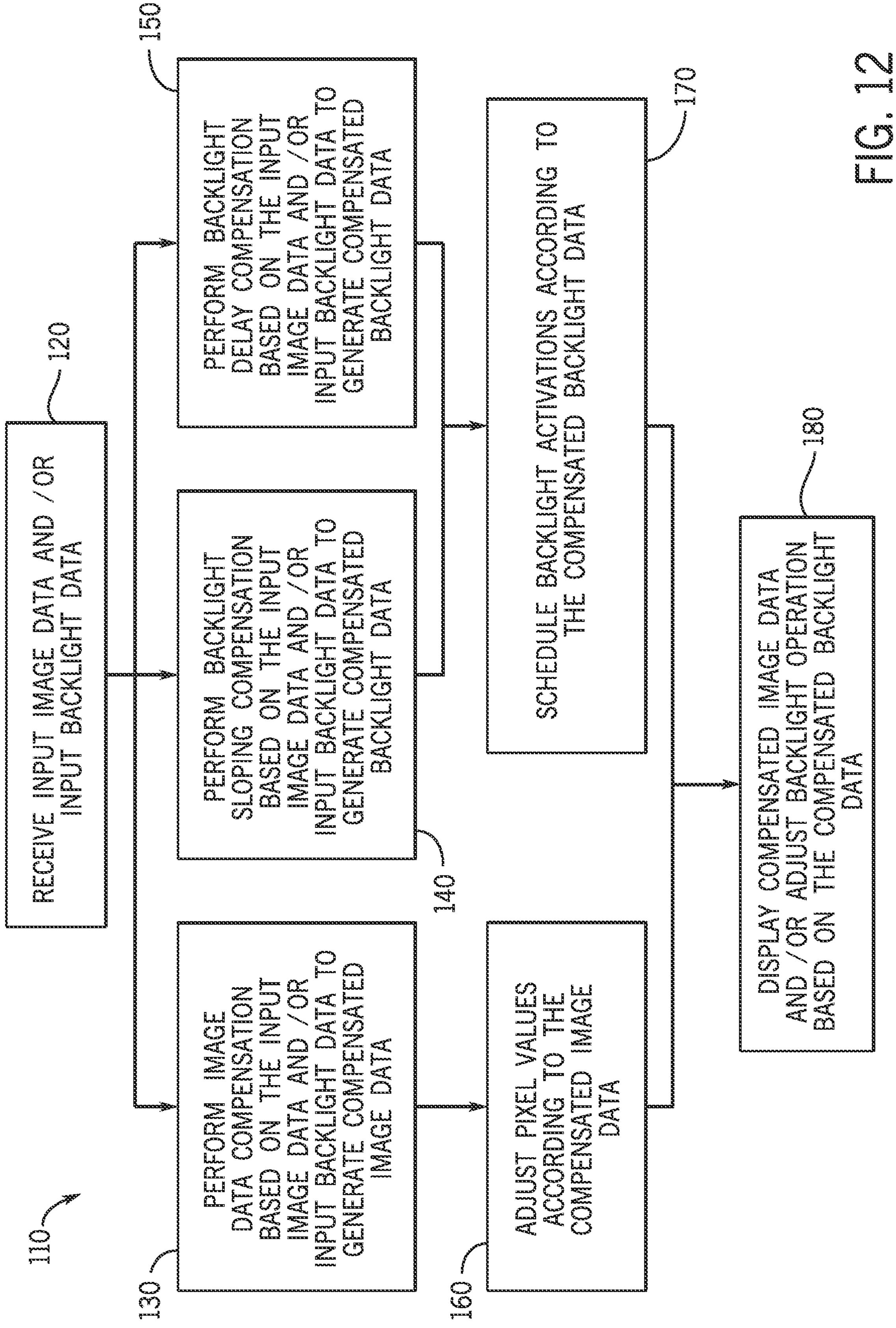
FIG. 12 is a flowchart of an example process for compensating image data and/or backlight data to account for a color shift associated with a change in the backlight brightness, in accordance with an embodiment.

FIG. 12 is a flowchart 110 of an example process for compensating input image data 66 and/or input backlight data 80 to account for a color shift associated with a change in the backlight brightness. The process may include receiving (e.g., via a CSC block 52 of image processing circuitry 28) input image data 66 and/or input backlight data 80 (process block 120). As should be appreciated, in some scenarios, the CSC block 52 may generate compensated image data 82 and/or compensated backlight data 84 without receiving input backlight data 80. For example, the compensated backlight data 84 may be used to usurp or be combined with backlight control data without receiving the input backlight data 80 at the CSC block 52. Moreover, in some embodiments, the input backlight data 80 (e.g., indicative of the desired backlight level) may be included in or based on the input image data 66. Based on the input image data 66 and/or the input backlight data 80, image data compensation 86 may be performed to generate compensated image data 82 (process block 130). Additionally or alternatively, based on the input image data 66 and/or the input backlight data 80, backlight sloping compensation 88 may be performed to generate compensated backlight data 84 (process block 140). Additionally or alternatively, based on the input image data 66 and/or the input backlight data 80, backlight delay compensation 90 may be performed to generate compensated backlight data 84 (process block 150). Additionally, pixel values for the image frame 72 may be adjusted according to the compensated image data 82 (process block 160) and/or the backlight activations may be scheduled according to the compensated backlight data 84 (process block 170). As should be appreciated, the compensated backlight data 84 of the backlight sloping compensation 88 and the backlight delay compensation 90 may be generated together (e.g., the backlight sloping compensation 88 and the backlight delay compensation 90 may be considered simultaneously/together) or may be combined during frame scheduling, if both are implemented. The compensated image data 82 may be displayed on the electronic display 12 and/or operation of the backlight may be adjusted based on the compensated backlight data (process block 180).

As discussed herein, the above techniques for reducing the likelihood of image artifacts (e.g., discoloration) due to backlight brightness changes may be implemented individually or in conjunction with one another. Moreover, as discussed above, in the case of decreasing backlight brightness, the above techniques may be used in reverse. For example, image data compensation 86 may be used to decrease the red pixel values and/or increase the blue/green pixel values. Additionally, as discussed above, backlight delay compensation 90 may be utilized at any backlight change (e.g., increasing or decreasing) where the pixel transmittance 70 is being reduced. Moreover, during backlight sloping compensation 88 the backlight may be reduced in stages to reduce the disparity 76 in the backlight profiles 68 and, thereby, reduce the likelihood of visual artifacts such as discoloration 78. Although the above flowchart 110 is shown in a given order, in certain embodiments, process/decision blocks may be reordered, altered, deleted, and/or occur simultaneously. Additionally, the flowchart 110 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display comprising:

a backlight configured to generate light based on backlight data, wherein the backlight comprises a first color component illuminator and a second color component illuminator, the first color component illuminator having a slower response rate than the second color component illuminator; and a plurality of display pixels configured to modulate an amount of the generated light emitted from the electronic display to display an image during an image frame; and processing circuitry configured to regulate, via the backlight data, a change in a brightness level of the backlight from a first brightness level to a second brightness level, wherein regulating the change in the brightness level comprises staging the change in the brightness level over a plurality of sub-frames of the image frame.

2. The electronic device of claim 1, wherein staging the change in the brightness level comprises staging the change in the brightness level of the first color component illuminator separately from the second color component illuminator.

3. The electronic device of claim 1, wherein staging the change in the brightness level comprises increasing the brightness level of the backlight from the first brightness level to a third brightness level for a first sub-frame of the plurality of sub-frames and increasing the brightness level of the backlight from the third brightness level to the second brightness level for a second sub-frame of the plurality of sub-frames subsequent to the first sub-frame.

4. The electronic device of claim 3, wherein staging the change in the brightness level comprises:

increasing, via the backlight data, the brightness level of the second color component illuminator from the first brightness level to the third brightness level for the first sub-frame;

increasing, via the backlight data, the brightness level of the second color component illuminator from the third brightness level to the second brightness level for the second sub-frame; and increasing, via the backlight data, the brightness level of the first color component illuminator from the first brightness level to the second brightness level for the first sub-frame.

5. The electronic device of claim 1, wherein regulating the change in the brightness level comprises delaying the change in the brightness level by a period of time relative to a beginning of the image frame.

6. The electronic device of claim 5, wherein the electronic display is configured to increase a pixel transmittance during a second image frame prior to the image frame to compensate for a backlight delay of the second image frame, wherein the pixel transmittance is decreased during the period of time.

7. The electronic device of claim 5, wherein the period of time comprises one or more sub-frames of the image frame.

8. The electronic device of claim 1, wherein the first color component illuminator comprises a first color component LED and the second color component illuminator comprises a second color component LED.

9. The electronic device of claim 8, wherein the first color component LED comprise a KSF phosphor LED.

10. The electronic device of claim 1, wherein the processing circuitry comprises a hardware pipeline having dedicated color shift compensation circuitry configured to generate, at least in part, the backlight data.

11. Image processing circuitry configured to:

receive input image data for an image frame, the input image data comprising first color component pixel values and second color component pixel values;

generate backlight data based on the input image data, wherein the backlight data is configured to regulate a change in a brightness level of a backlight of an electronic display, wherein the backlight comprises a first color light emitting diode (LED) and a second color LED, wherein the first color LED comprises a different timing profile than the second color LED, wherein regulating the change in the brightness level comprises delaying the change in the brightness level by a period of time relative to a beginning of the image frame; and output the backlight data to the backlight.

12. The image processing circuitry of claim 11, wherein a pixel transmittance of the electronic display is deceased during the period of time.

13. The image processing circuitry of claim 12, wherein the electronic display is configured to increase the pixel transmittance during a second image frame prior to the image frame to compensate for a backlight delay of the second image frame.

14. The image processing circuitry of claim 11, wherein regulating the change in the brightness level comprises staging the change in the brightness level over a plurality of sub-frames of the image frame.

15. The image processing circuitry of claim 14, wherein staging the change in the brightness level comprises staging the change in the brightness level of the first LED separately from the second LED.

16. The image processing circuitry of claim 11, wherein the image processing circuitry is configured to alter the first color component pixel values, the second color component pixel values, or both, in response to the change in the brightness level.

17. A non-transitory, machine-readable medium comprising instructions, wherein, when executed by one or more processors, the instructions cause the one or more processors to control operations of image processing circuitry, the operations comprising:

receiving input image data for an image frame, the input image data comprising first color component pixel values and second color component pixel values;

generating backlight data based on the input image data, wherein the backlight data is configured to regulate a change in a brightness level of a backlight of an electronic display, wherein the backlight comprises a first color component illuminator and a second color component illuminator, the first color component illuminator having a slower response rate than the second color component illuminator, wherein regulating the change in the brightness level comprises:

delaying the change in the brightness level by a period of time relative to a beginning of the image frame;

staging, over a plurality of sub-frames of the image frame, the change in the brightness level of the first color component illuminator separately from the change in the brightness level of the second color component illuminator; or both; and outputting the backlight data to the backlight.

18. The non-transitory, machine-readable medium of claim 17, wherein regulating the change in the brightness level comprises the delaying, and wherein a pixel transmittance of the electronic display is deceased during the period of time.

19. The non-transitory, machine-readable medium of claim 18, wherein regulating the change in the brightness level comprises the staging, and wherein staging the change in the brightness level comprises:

increasing, via the backlight data, the brightness level of the second color component illuminator from a first brightness level to a second brightness level for a first sub-frame of the plurality of sub-frames;

increasing, via the backlight data, the brightness level of the second color component illuminator from the second brightness level to a third brightness level for a second sub-frame of the plurality of sub-frames subsequent to the first sub-frame; and increasing, via the backlight data, the brightness level of the first color component illuminator from the first brightness level to the second brightness level for the first sub-frame.

20. The non-transitory, machine-readable medium of claim 17, wherein regulating the change in the brightness level comprises the delaying and the staging.

* * * * *